Figure 1:
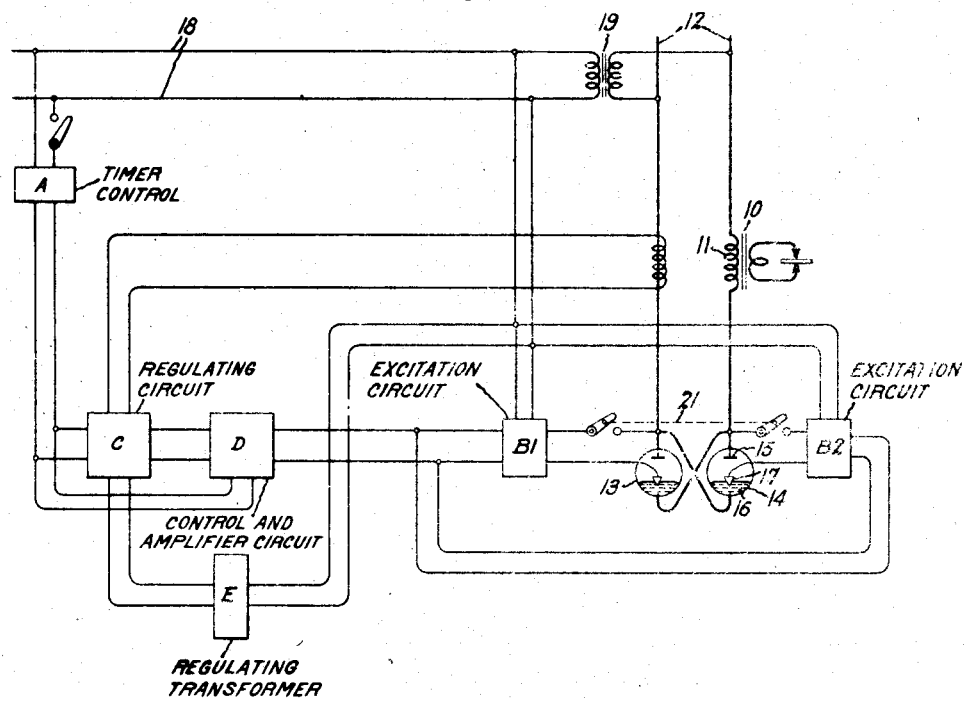

Inventor:
Bertram G. Higgins,
by Harry E. Dunham
His Attorney.

UNITED STATES PATENT OFFICE 2,395,626

ELECTRIC CONTROL CIRCUIT

Bertram G. Higgins, Rugby, England, assignor to General Electric Company, a corporation of New York Application October 7, 1943, Serial No. 505,316
In Great Britain October 6, 1942

8 Claims. (Cl. 171—119)

My invention relates to improved electric control circuits and particularly to improved control or regulating circuits for regulating an electrical condition of an alternating-current load circuit which is intermittently energized through controlled electric valve means.

In resistance welding, for example, it is essential to high quality welds that the current supplied to the work be maintained substantially independent of line voltage fluctuations and changes in circuit constants, due for instance, to changes in the position of the work pieces in the throat of the welding machine. Utilizing the actual load current as a controlling influence provides satisfactory regulation after the first cycle or first few cycles of each period of energization and, in some cases, may provide an acceptable control. However, in many cases, it is essential that the current be regulated during the first cycle or cycles of each period of energization and this becomes particularly important as the periods of energization are shortened in length. In accordance with the teachings of the present invention, I provide a new and improved electric control circuit for regulating an electrical condition such as the current supplied to an intermittently energized load circuit.

It is an object of my invention to provide a new and improved electric control circuit.

It is another object of my invention to provide a new and improved circuit for regulating an electrical condition of a load circuit which is energized intermittently by alternating current through controlled electric valve means.

It is still another object of my invention to provide an improved control circuit particularly adapted for resistance welding applications in which a predetermined value of welding current is supplied to the load circuit during each cycle of energization of the load circuit.

In accordance with the illustrated embodiment of my invention, the welding transformer is energized from an alternating current supply circuit under the control of a pair of reversely connected electric valve means which conduct current to establish periods of energization of the load circuit, the duration of which is determined by a timer control which produces a timing voltage, such as a sine-wave voltage of interrupted or intermittent character. The heating value of the current supplied to the welding transformer is determined by a regulating circuit which controls the instant in the positive anode voltage wave that each of the reversely connected electric valves is rendered conductive. In accordance with the present invention, the regulating circuit produces a sinusoidal voltage which has a phase displacement during periods of deenergization of the load circuit dependent upon the magnitude of a preset control voltage. During periods of energization of the load circuit, the sinusoidal voltage has a variable phase displacement dependent upon the resultant of this preset voltage, a reference voltage obtained from the timer control, and a voltage responsive to the current supplied to the load circuit. Inasmuch as the reference voltage obtained from the timing circuit and the voltage responsive to the load current both disappear during periods of deenergization, these voltages may be introduced into the control circuit in series and the transfer from "off-time" to "on-time" regulation accomplished without any complicated switching arrangement.

My invention will be better understood by reference to the following description taken in connection with the accompanying drawings and its scope will be pointed out in the appended claims. In the drawings, Fig. 1 illustrates diagrammatically one embodiment of my invention and Fig. 2 is a schematic representation of the modification of Fig. 1 showing the component parts of the control in more detail.

Referring to Fig. 1 of the drawings, I have shown my invention incorporated in a system for controlling the energization of a welding transformer 10 having a primary winding 11 connected with a single phase alternating-current supply circuit 12 through a pair of reversely connected electric valve means 13 and 14. These electric valve means are identical and, as illustrated, may be of the type comprising an anode 15, a cathode of conducting liquid 16, such as mercury, and an immersion-ignitor control member 17. The energization of the control members 17 of the electric valve means 13 and 14 is controlled by the excitation circuits illustrated diagrammatically at B1 and B2, respectively. These circuits transmit impulses of current to the control member 17 for a number of cycles of the supply circuit 12 determined by a timer control illustrated diagrammatically at A and at instants in the positive half cycles of anode voltage of the valve means 13 and 14 determined by a regulating circuit illustrated diagrammatically at C. The timer control is preferably of the type that produces a sinusoidal voltage of intermittent character corresponding to the desired energization of the load. The timer may be to advantage of the type described in British Patent 416,374 or British Patent 528,247. The excitation circuits B1 and B2 are energized in accordance with the output of the timer control A and the regulating circuit C by means of a control and amplifying circuit illustrated diagrammatically at D. A supply of alternating current control voltage for the various circuits is provided by the alternating-current circuit 18 which may be energized from the supply circuit 12 through a transformer 19. The circuit 18 provides a source of unregulated alternating voltage for the timer control A, the excitation circuits B1, B2, and the control and amplifier circuit D. A source of regulated voltage for the regulating circuit C is obtained from the circuit 18 by means of a regulating transformer illustrated schematically at E.

Figure 2:
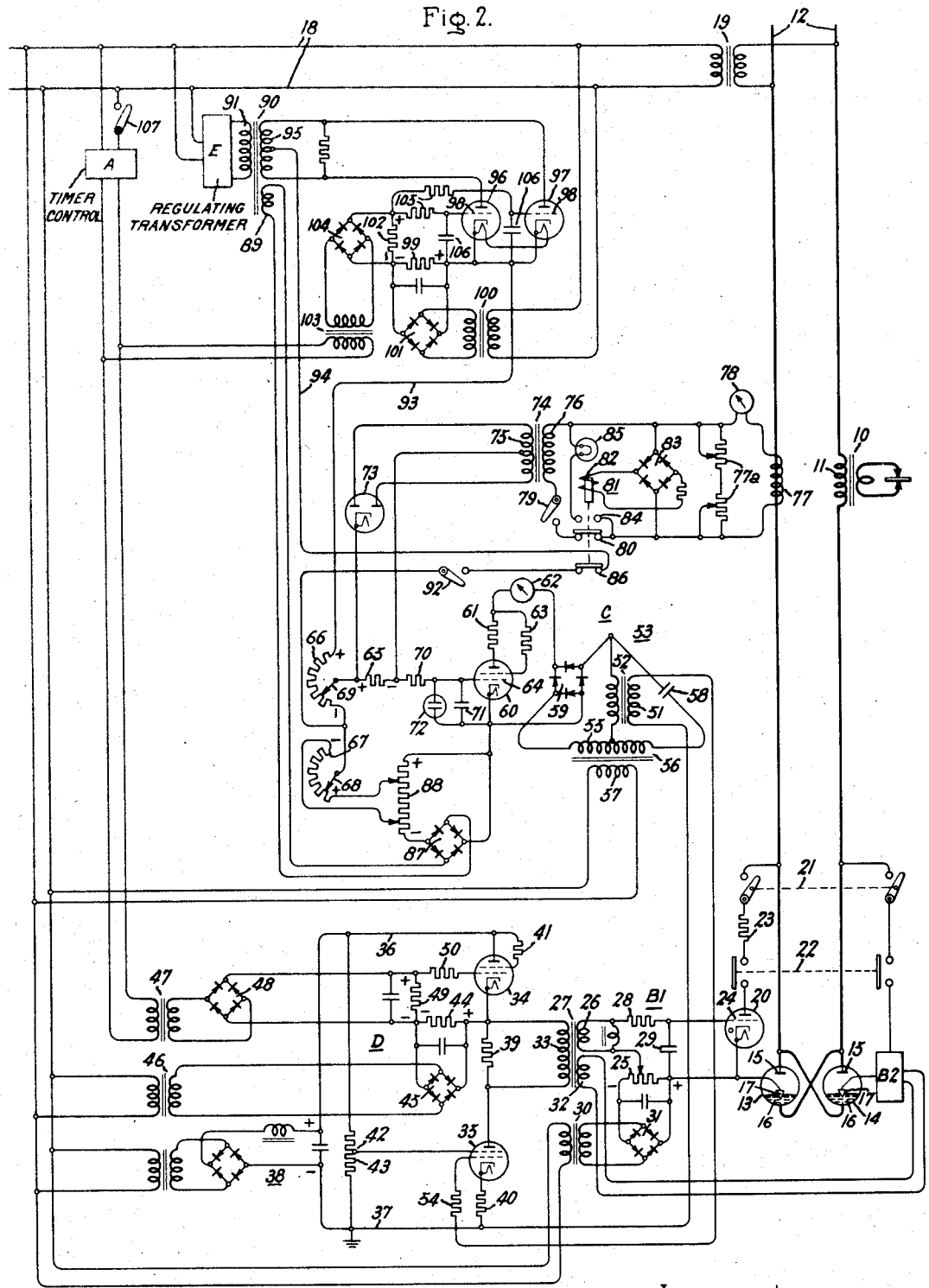

A detailed understanding of the illustrated embodiment of my invention may be had by reference to Fig. 2 which illustrates in detail the circuits illustrated diagrammatically at B1, C and D in Fig. 1. Referring now to Fig. 2, control impulses of current are transmitted to the control member 17 of the electric valve means 13 by a control or firing valve 20, preferably of the gas-filled type and having the anode-cathode circuit thereof connected between the anode 15 and control member 17 of the electric valve means 13 through contacts of switches 21 and 22 and a current-limiting resistor 23. The electric valve 20 is provided with a control member or grid 24 which is energized to determine the number of cycles and the instant in each cycle that electric valve 13 is rendered conductive. The circuit of the control member 24 includes a resistor 25 for impressing a negative or "hold-off" bias on the control member 24 and the secondary winding 26 of a transformer 27 for impressing on the control member a periodic voltage of peaked wave form for an interval determined by the timer control A and having a phase relation determined by the regulating circuit C. The circuit of the control member 24 also includes a current-limiting resistance 28 and a transient-suppressing capacitor 29 connected between the control member and the cathode thereof. The "hold-off" or negative bias voltage across the terminals of the resistor 25 is derived from the alternating-current circuit 18 through a transformer 30 and a full-wave rectifier 31. The excitation circuit for the control member 17 of electric valve 14 is essentially the same as that described in connection with the electric valve means 13 and has been illustrated diagrammatically at B2. The firing or "turn-on" voltage for the excitation circuit for valve means 14 is supplied by the secondary winding 32 of the transformer 27 and has the proper instantaneous polarity to control the electric valve 14.

The primary winding 33 of the transformer 27 is energized in accordance with the output of the regulating circuit C and, for periods determined by the timer control circuit A, by the conjoint action of electric valves 34 and 35 of the control and amplifier circuit D. These electric valves are preferably of the high-vacuum tetrode type. The anode-cathode circuits of electric valves 34 and 35 are connected in series and across the direct-current lines 36 and 37 of a direct-current control voltage supply derived from the alternating-current circuit 18 by means of a rectifier and filter circuit illustrated generally by the numeral 38. A resistor 39 is connected between the cathode of valve 34 and the anode of valve 35 and a resistor 40 is connected between the cathode of valve 35 and the negative of direct-current line 37. As illustrated the resistor 39 is the load resistor and provides the voltage from which the primary winding 33 of the transformer 27 is energized. The resistor 40, in the cathode connection of valve 35, provides a source of negative bias for this valve. The screen grid of valve 34 is connected with the positive line 36 of the direct-current circuit through a resistor 41 and the screen grid of valve 35 is connected to a suitable voltage intermediate the conductors 36 and 37 established by the terminal 42 of a voltage-dividing resistor 43. The electric valve 34 may be considered a keying valve and its function is to maintain the resistor 39 deenergized during periods when it is desired that the welding transformer 10 be deenergized. To this end, the control member of valve 34 is energized with a negative bias voltage impressed across resistor 44 by a rectifier bridge 45 and a transformer 46 having the primary thereof energized from the alternating-current circuit 18. A positive or "turn-on" voltage is derived from the output of the timer control A by means of transformer 47 and a rectifier bridge 48 and impressed on a resistor 49 which is connected in series with the negative bias resistor 44 and a current-limiting resistor 50 in the cathode-to-control-member circuit of electric valve 34. The bias voltages of resistors 44 and 49 are so proportioned that the voltage of resistor 44 biases the valve 34 to cut-off during periods of no voltage output of the timer. In order that the phase of the voltage appearing across resistor 39 corresponds to the output of the regulating circuit C, the control member of the valve 35 is energized from the secondary winding 51 of an output transformer 52 of a phase-shifting circuit 53. The circuit of the control member of the valve 35 also includes a current-limiting resistor 54 and the bias resistor 40. Thus, the circuit D operates to impress a periodic voltage of substantially sinusoidal wave form on the primary winding of the transformer 32 during the periods that electric valve 34 is rendered conductive by the timer control and with a phase relation dependent upon the voltage of the output transformer 52 of the regulating circuit C.

The manner in which the output voltage of circuit C is derived from the timer control and load circuit will now be described. The phase-shifting circuit 53 is of the bridge type and comprises a midtapped secondary winding 55 of a transformer 56 having the primary winding 57 energized from the alternating-current circuit 18. The halves of the midtapped winding 55 provide two arms of the bridge circuit, the other two of which include a capacitor 58 and the alternating-current terminals of a rectifier bridge 59. The primary winding of the output transformer 52 is connected between the midtap of the secondary winding 55 and the common terminal of the rectifier bridge 59 and the capacitor 58. As will readily be understood by those skilled in the art, the effective alternating-current resistance of the bridge circuit 59 may be controlled by controlling the impedance connected across the direct-current terminals thereof. As a means for providing such a controllable impedance, I employ an electric valve, preferably of the high-vacuum tetrode type, having the anode-cathode circuit connected across the direct-current terminals of the rectifier bridge 59 through a resistor 61 and an indicating ammeter 62. The valve 60 is provided with a screen grid which is maintained at a positive potential with respect to the anode by means of a resistor 63 connected between the screen grid and the terminal of resistor 61 remote from the anode. The valve 60 is also provided with a control member or grid 64 which is energized in accordance with the resultant of three voltages impressed respectively on a resistor 65, a resistor 66, and a resistor 67. The cathode-to-control-member circuit includes a portion of the resistance 67 determined by the position of an adjustable tap 68, a portion of the voltage of resistor 66 determined by the position of an adjustable tap 69, and the total voltage of resistor 65. A resistance 70 in series with the control member 64 and a capacitor 71 connected directly between the cathode and control member of the valve 60 are designed to have a time constant equal to several cycles of the alternating-current supply circuit. A glow-discharge device 72 may be connected in parallel with capacitor 71.

The circuits for obtaining the voltages appearing across resistors 65, 66 and 67 will now be described. The resistor 65 is energized by the output of a full-wave rectifier which may comprise an electric discharge device 73 of the double-diode type and a transformer 74 having a midtapped secondary winding 75. The primary winding 76 of the transformer 74 is energized in accordance with the welding or load current by means of a current transformer 77 associated with one of the line conductors of the alternating-current circuit 12. The circuit of the primary winding 76 is completed from the terminals of the current transformer 77 through an indicating ammeter 78, a manual switch 79, and a normally closed contact 80 of an electromagnetic relay 81. The ratio of current in the load circuit to the voltage across the terminals of the current transformer may be adjusted by taps on the resistors 77a which shunt the current transformer. The relay 81 has the operating coil 82 thereof energized in accordance with the direct-current output voltage of a rectifier bridge 83 having the alternating-current terminals thereof energized in accordance with the voltage appearing across the terminals of the current transformer 77. The relay 81 is also provided with a normally open contact 84 which completes an energizing circuit for an indicating lamp 85 when the output voltage of the rectifier bridge exceeds a predetermined value. A normally closed contact 86 of the relay 81 controls the energizing circuit of resistor 66. A rectifier bridge 87, the direct-current terminals of which are loaded by a resistance 88 supplies a voltage to the resistor 67. The alternating-current terminals of the bridge 87 are energized from a regulated source of alternating current which, as illustrated, comprises the secondary winding 89 of a transformer 90 having a primary winding 91 energized from the output of the regulating transformer E. A suitable manual switch 92 is connected in series with the normally closed contact 86 of relay 81 to open the energizing circuit of the resistor 66.

The voltage appearing across the resistance 66 is obtained from the output conductors 93 and 94 of a biphase rectifier circuit including a midtapped secondary winding 95 of the transformer 90 and a pair of electric valves 96 and 97 which may, for example, be of the three-element gaseous discharge type. The valves 96 and 97 are provided with control members 98 which are energized to render the electric valves 96 and 97 conductive intermittently in accordance with the output of the timer control circuit A. The control members are normally maintained negative by the voltage appearing across a bias resistor 99 which may, to advantage, be energized from the alternating-current 18 through a transformer 100 and a rectifier bridge 101. A "turn-on" or positive voltage is impressed on the control members 98 by a resistor 102 which is energized from the output circuit of the timer control A through transformer 103 and the rectifier bridge 104. The circuit of each of the control members 98 includes a current-limiting resistor 105 and a transient-suppression capacitor 106 which is connected directly between the cathodes and the respective control members 98 of the electric valves 96 and 97. Thus the voltage across the resistance 66 is intermittent corresponding to the output voltage of the timer control A and is regulated in magnitude by the operation of the regulating transformer E. A manual switch 107 may be included in the energizing circuit of the timer control to control the initiation of energization of the load.

The circuit of the control member 64 of the electric valve 60, therefore, contains a source of negative bias of preset value appearing across resistor 67 and determined by the position of the slider 68, a second component of voltage having a positive polarity which occurs intermittently at intervals determined by the timer voltage and a third component which is of negative polarity and variable in accordance with the current supplied to the load.

A better understanding of the objects and advantages of my invention may be had by a consideration of the operation of the system illustrated in Fig. 2 and described in detail in the preceding paragraphs. Let it be assumed that the alternating-current supply circuit 12 has been energized by the closing of suitable switching means (not shown), and that the switches 21, 22, 79 and 92 have been closed and switch 107 is open. It is also assumed that the cathodes of all the electric valves are at proper operating temperature. Uunder these conditions, no welding current is flowing and no voltage is produced across the resistor 65 by current transformer 77 and rectifier 73. The valves 96 and 97 are maintained nonconductive by the bias of resistor 99 so that no voltage appears across the resistor 66. The energization of the control member 64 of the electric valve 60 associated with the phase-shifting circuit 53 is under these conditions determined by the magnitude of the preset voltage appearing across a portion of a resistor 67 as determined by the position of the slider 68 which, therefore, provides a manual heat-control adjustment. The keying valve 34 is maintained nonconductive by the negative bias appearing across the resistor 44. The amplifier valve 35 has the control member thereof energized in accordance with the output voltage of the phase-shifting circuit 53. However, since valve 34 is nonconducting, no current is conducted by valve 35 and the transformer 27 is deenergized. The negative bias appearing across resistor 25 in the control member circuit of electric valve 20 is effective to maintain electric valve 20 and, as a result, electric valve 13 nonconducting.

If it is desired to initiate a period of energization of the load circuit or a succession of such periods if the timer control is adapted for seam welding, switch 107 is closed to energize the timer control. As mentioned earlier, the particular voltage produced by the timer control of the illustrated embodiment is assumed to be a sinusoidal voltage of intermittent character which appears during only those intervals that the load circuit is to be energized. As soon as the output voltage of the timer control appears, transformers 47 and 103 are energized. The output of transformer 47 appears as a positive bias across resistor 49 and renders the keying electric valve 34 conductive so that current is conducted through valve 34, resistor 39, and valve 35 to energize the transformer 27 with a sinusoidal voltage having a phase position dependent on the output voltage of the phase-shifting circuit 53. The transformer 27 may, to advantage, be a peaking transformer and thereby produce positive voltage impulses in the secondary windings 26 and 32 thereof sufficient to render the firing electric valves 20 associated with electric valve means 13 and 16 conducting alternately at phase positions determined by the output of the phase-shifting circuit 53. As soon as current starts to flow to the load circuit through the valves 13 and 14, a voltage appears across the resistor 65 which has a magnitude dependent upon the magnitude of the current flowing and the adjustment of the taps on the resistors 77a. The conductivity of valve 60 and, as a result, the conductivity of valve means 13 and 14 is now controlled in accordance with variations in the voltage appearing across resistor 65, or in other words, in accordance with welding current. It has been found in practice that the current responsive voltage of resistor 65 and the intermittent reference voltage of resistor 66 may be in the order of 400 volts and the preset or heat-control bias-voltage of the resistor 67 may be in the order of 40 volts. As soon as the welding period is terminated by operation of the timer control, keying valve 34 becomes nonconductive and the voltages of resistors 65 and 66 disappear, returning the control of the valve 60 to the preset or heat-control bias of resistor 67.

The relay 81 operates as a protective device to remove the regulator automatically if the current supplied to the load circuit exceeds a predetermined value. When the relay 81 picks up, contacts 80 and 86 are opened to deenergize resistors 65 and 66 and thereby return the control to the manual heat-control bias alone. The manual switches 79 and 92 provide means for manually removing the current regulator from operation.

While I have shown and described a particular embodiment of my invention, it will be obvious to those skilled in the art that changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. An alternating current supply circuit, a load circuit, electric valve translating apparatus interconnecting said circuits and including electric valve means having a control electrode, a control circuit for energizing said control electrode to effect the transmission of current to said load circuit for a predetermined period or periods measured in cycles of said supply circuit and to render said valve means conductive at variable instants in the voltage wave of said supply circuit to regulate the magnitude of the current supplied to said load circuit, said control circuit comprising timing means for determining said period or periods, means responsive to said timing means for producing a reference voltage having a duration corresponding to the duration of said period or periods, means responsive to the current supplied to said load circuit for producing a regulating voltage, and means for energizing said control electrode in response to the algebraic sum of said reference voltage and said regulating voltage to regulate the magnitude of said load current.

2. An alternating current supply circuit, a load circuit, electric valve translating apparatus interconnecting said circuits and including electric valve means having a control electrode, a control circuit for energizing said control electrode to effect the transmission of current to said load circuit for a predetermined period or periods measured in cycles of said supply circuit and to render said valve means conductive at variable instants in the voltage wave of said supply to regulate the magnitude of the current supply to said load circuit, said control circuit comprising means for producing a timing voltage for determining said period or periods, means responsive to said timing voltage for producing a unidirectional reference voltage having a substantially constant magnitude during said period or periods, means responsive to the current supplied to said load circuit for producing a unidirectional regulating voltage of variable magnitude, and means for energizing said control electrodes in response to the difference in magnitude of said reference voltage and said regulating voltage to regulate said load current.

3. In combination, a supply circuit, a load circuit, electric translating apparatus interconnecting said circuits, timing means for controlling said translating apparatus to effect energization of said load circuit for a predetermined period or periods, a regulating circuit including means for producing a voltage responsive to an electrical condition of said load circuit and having a duration corresponding to the duration of said period or periods, means for producing a voltage which increases in magnitude abruptly at the beginning of each period of energization and decreases abruptly at the end of each period of energization, and means for controlling said translating apparatus during said period or periods in response to a control quantity having continuously throughout said period or periods a value variable in response to variations in the algebraic sum of said voltages to maintain said condition substantially constant.

4. In combination, a supply circuit, a load circuit, electric translating apparatus interconnecting said circuits, timing means for controlling said translating apparatus to effect energization of said load circuit for a predetermined period or periods, a regulating circuit including means for producing a variable unidirectional voltage responsive to the current supplied to said load circuit, means controlled by said timing means for producing an intermittent unidirectional voltage recurring at intervals corresponding to each period of energization of said load circuit, and means for controlling said translating apparatus in response to the difference in magnitude of said unidirectional voltages to maintain said condition substantially constant.

5. An alternating current supply circuit, a load circuit, electric translating apparatus interconnecting said circuits including electric valve means having a control electrode, timing means for controlling the energization of said control electrode to determine the period or periods of energization of said load circuit and a phase-shifting circuit for regulating the current supplied to said load circuit comprising means for supplying an alternating current voltage, an output circuit and means including an electric valve having a control member for controlling the phase of the voltage impressed on said output circuit with respect to said alternating-current voltage, means for producing a unidirectional voltage which varies in magnitude in accordance with an electrical condition of said load circuit, means for producing a unidirectional voltage which increases abruptly at the beginning and decreases abruptly at the end of each period of energization of said load circuit established by said timing means, means for producing an adjustable preset unidirectional voltage, means for energizing said control member in accordance with the algebraic sum of said voltages so that the phase relation of the voltage of said output circuit varies in accordance with said condition responsive circuit during periods of energization and is maintained at a preset phase position during periods of deenergization, and means responsive to said output circuit for energizing said control electrode.

6. An alternating current supply circuit, a load circuit, electric translating apparatus interconnecting said circuits including electric valve means having a control electrode, timing means for controlling the energization of said control electrode to determine the period or periods of energization of said load circuit and a phase-shifting circuit for regulating the current supplied to said load circuit comprising means for supplying an alternating current voltage, an output circuit and means including an electric valve having a control member for controlling the phase of the voltage impressed on said output circuit with respect to said alternating-current voltage means for producing a unidirectional voltage which varies in magnitude in accordance with an electrical condition of said load circuit, means for producing a unidirectional voltage which changes abruptly in magnitude at the beginning and end of each period of energization of said load circuit established by said timing means, means for energizing said control member in accordance with the difference of said unidirectional voltages so that the phase relation of the voltage of said output circuit varies in accordance with said condition responsive circuit during periods of energization, means for establishing a predetermined phase position of the voltage of said output during periods of deenergization of said load circuit, and means responsive to said output circuit for energizing said control electrode.

7. An alternating current supply circuit, a load circuit, electric translating apparatus interconnecting said circuits including electric valve means having a control electrode, an excitation circuit comprising a pair of electric valves in series for supplying voltage impulses to said control electrode when both said valves are conducting simultaneously, timing means for controlling one of said electric valves to determine the cycles of said supply circuit during which the load is energized and a regulating circuit for controlling the other of said valves to determine the instant in said cycles that said valve means is rendered conductive in accordance with an electrical condition of said load circuit comprising means for producing a voltage which varies in accordance with said condition, means controlled by said timing means for producing a reference voltage having one characteristic during periods of energization of said load circuit and a different characteristic during periods of deenergization of said load circuit, and means for controlling said second electric valve in accordance with a combination of said voltages.

8. An alternating current supply circuit, a load circuit, electric translating apparatus interconnecting said circuits including electric valve means having a control electrode, an excitation circuit comprising a pair of electric valves in series for supplying voltage impulses to said control electrode when both said valves are conducting simultaneously to determine the cycles of said supply circuit and the instants in said cycles that said valve means is rendered conducting, timing means for controlling one of said electric valves and a regulating circuit for controlling the other of said valves in accordance with the current supplied to said load circuit comprising means for producing a unidirectional voltage which varies in accordance with said current, means controlled by said timing means for producing a unidirectional reference voltage having one characteristic during periods of energization of said load circuit and a different characteristic during periods of deenergization of said load circuit, and means for controlling said second electric valve in response to the difference of said voltages.

BERTRAM G. HIGGINS.